United States Patent [19]

Ehling

[11] 4,324,515
[45] Apr. 13, 1982

[54] DIE SHEAR APPARATUS FOR TRIMMING WIRE WELD BULGES

[75] Inventor: John W. Ehling, LaGrange Park, Ill.

[73] Assignee: Western Electric Company, Inc., New York, N.Y.

[21] Appl. No.: 135,731

[22] Filed: Mar. 31, 1980

[51] Int. Cl.³ .............................................. B23D 1/02
[52] U.S. Cl. .................................... 409/300; 83/914; 219/97; 228/13; 279/1 SJ; 407/64; 407/115; 409/140
[58] Field of Search ....................... 409/300, 298, 140; 407/64, 115, 116; 83/914; 140/112; 228/13, 125; 219/97, 103; 279/1 SJ

[56] References Cited

U.S. PATENT DOCUMENTS

| | | | |
|---|---|---|---|
| 423,979 | 3/1890 | Anderson et al. | 409/300 |
| 1,817,695 | 8/1931 | Lauenstein | 279/1 SJ X |
| 2,233,928 | 3/1941 | Weaver | 407/115 X |
| 2,920,511 | 1/1960 | Johnson | |
| 2,945,117 | 7/1960 | Harris et al. | 219/97 |
| 3,015,995 | 1/1962 | Fahy | 409/300 |
| 3,227,851 | 1/1966 | Greenberger | 219/97 |
| 3,790,058 | 2/1974 | Filkorn | 228/2 |

Primary Examiner—Z. R. Bilinsky
Attorney, Agent, or Firm—R. P. Miller

[57] ABSTRACT

A bulge (12) formed by coldwelding two wire sections (10-11) is removed by advancing the wire through a bore (91) formed in a split cutting tool (64) having a pair of stepped-back tapered surfaces (92,96) at one end. The tapered surfaces terminate along a diameter of the bore to form a pair of spaced semi-elliptical cutting surfaces (93,97) which are successively rendered effective to remove semi-circular sections of the bulge. The apparatus includes facilities (31,32) for temporarily holding the wire in place within the cutting tool (64) and a clamping arrangement (35,36) for securely holding the wire during the weld bulge removal operation.

3 Claims, 10 Drawing Figures

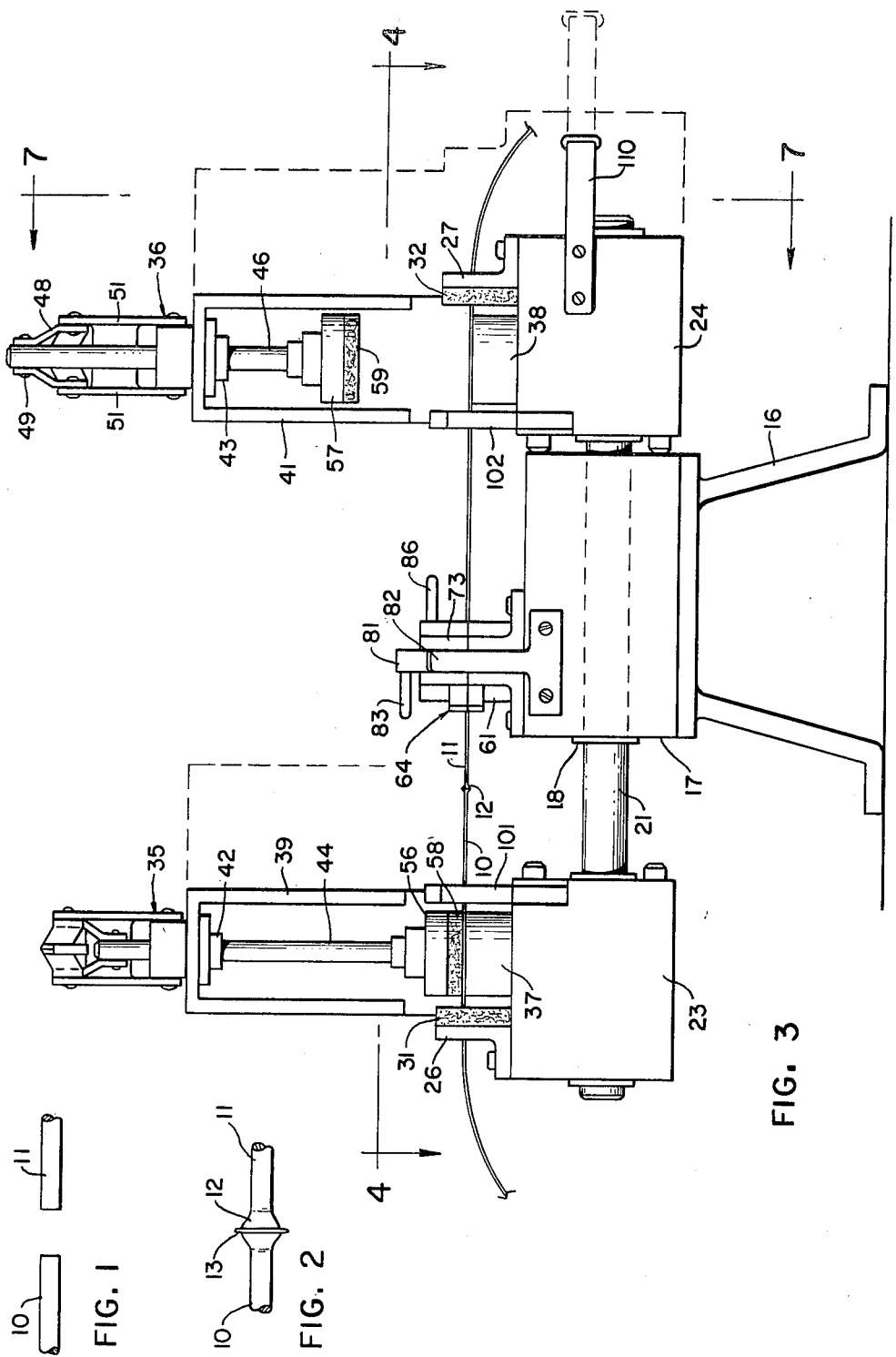

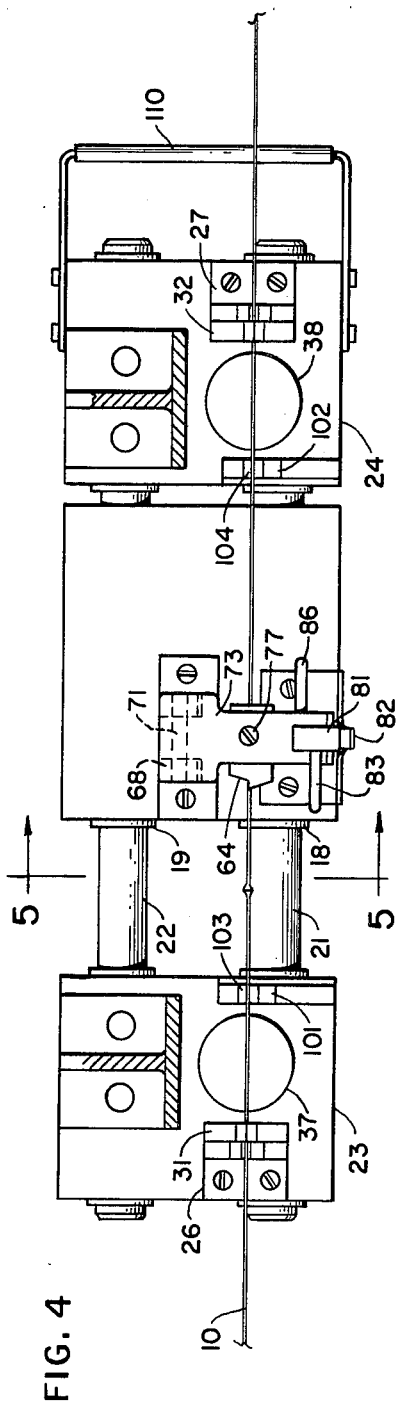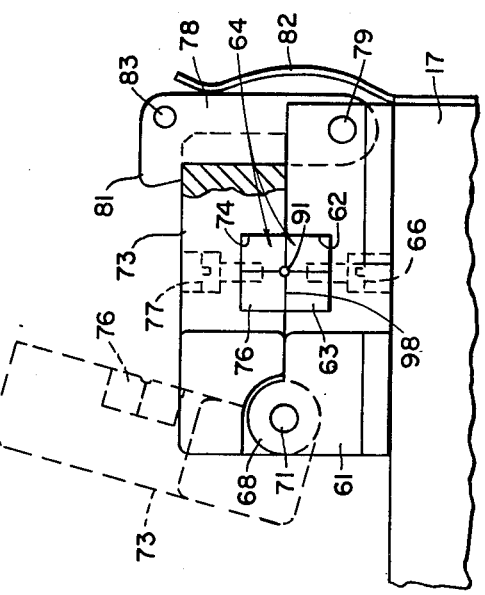
FIG. 4
FIG. 5
FIG. 6

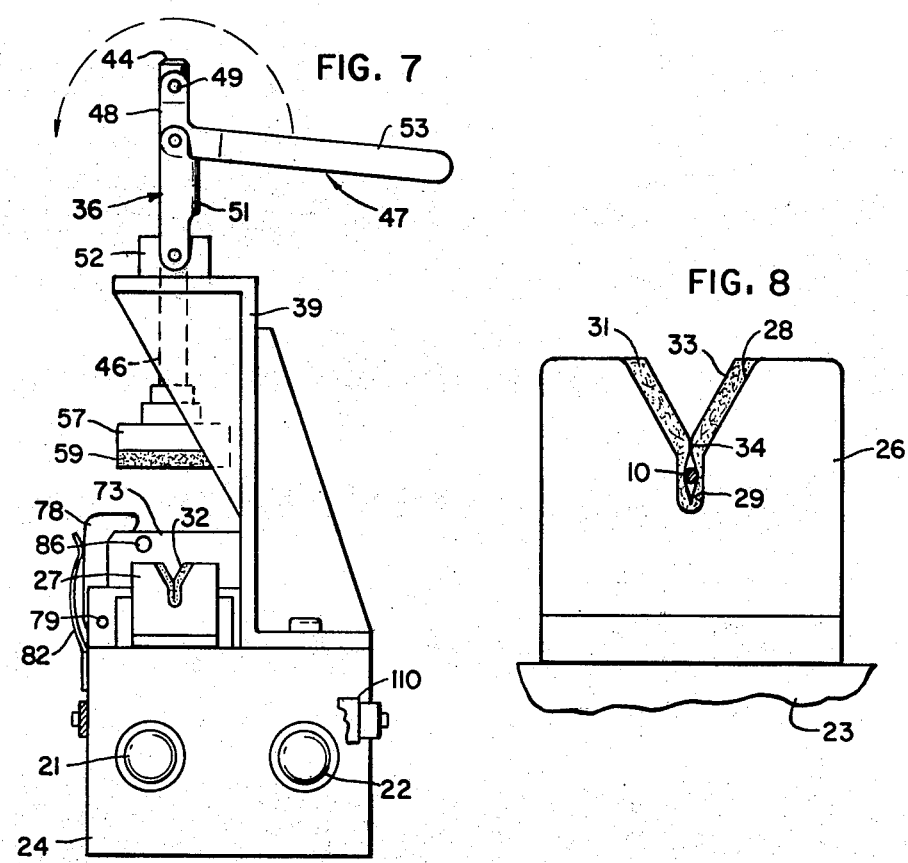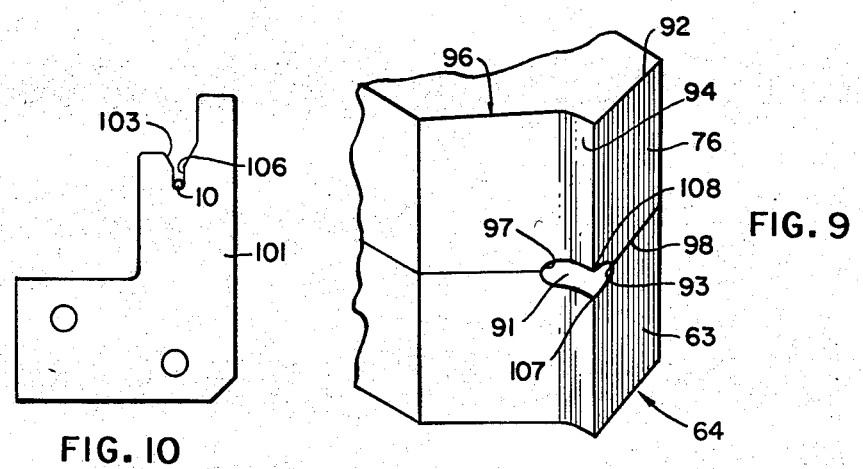

DIE SHEAR APPARATUS FOR TRIMMING WIRE WELD BULGES

FIELD OF THE INVENTION

This invention relates to shearing apparatus of the type that may be utilized to remove weldment bulges or flash formed at a juncture of welded wire sections, and more particularly to the construction of a die shear arrangement that successively removes semicircular sections of the weldment bulge from small diameter flexible wire without weakening the wire.

BACKGROUND OF THE INVENTION

In the wire fabricating industry, it is common practice to weld a trailing end section of a first wire to a leading end section of a second wire in order to maintain a continuous supply of wire for the continuous operation of wire processing equipment.

This welding operation, which may be either hot or cold, is accompanied by the application of forces along the axes of the respective wires so that the abutted wire ends are upset to form a bulge and/or flash at the welded joint. The formation of this bulge would interfere with the subsequent processing of the wire, and numerous diverse types of apparatus have been developed to remove the weldment bulges and flash.

In one class of welding apparatus, the wire sections are gripped by pairs of welding electrodes. The pairs of electrodes are electrically heated and forcibly moved toward each other to abut the trailing end of one wire against the leading end of a second wire, resulting in a bulging out of the wire material about the welded joint. These welding electrodes are formed with projecting conical heads that are forced toward each other during the welding operation to shear the bulging wire material at the joint. An example of this type of apparatus is shown in U.S. Pat. No. 2,945,117 issued to J. F. Harris et al. on July 12, 1960. As described in the Harris et al. patent, a substantial portion of the weldment bulge is removed but there still remains a pair of projecting weldment fins which are subsequently removed by moving the wire and the fins against a pair of stationary cutters.

Another type of apparatus is exemplified by a patent to R. L. Filkorn, U.S. Pat. No. 3,790,098, issued Feb. 5, 1974, where the ends of two workpieces are forced together and spun to effectuate a fusing of the workpieces. This fusing operation also results in the formation of a weldment bulge which is substantially removed by the movement of a pair of semi-conical dies along the joined workpieces to abut and cut the weldment bulge.

Another class of apparatus contemplates a coldwelding operation where the end sections of a pair of wires are again gripped between two pairs of jaws having projecting conical cutters. The pairs of jaws are moved toward each other to abut the ends of the wires with sufficient force to fuse weld the ends of the wires. This fusing action is accompanied by a bulging of the upset ends of the wires. The jaws are further moved together so that the conical cutters move toward each other to shear the bulge. An example of this type of apparatus is disclosed in U.S. Pat. No. 2,920,511 issued Jan. 12, 1960, to K. F. Johnson.

U.S. Pat. No. 3,227,851 issued to U. I. Greenberger on Jan. 4, 1966, shows welding apparatus for heat welding the ends of two flat strips. The respective strips are clamped, heated and then forced together so that there is a bulging of the material at the welded joint. The weld bulge or flash is removed by moving two sets of cutting dies transversely of the strips. The sets of cutting dies are mounted to be progressively closer together so that the cutting dies progressively shave the weld flash.

These prior art devices are generally satisfactory for removing weld bulges where the welded stock is of a relatively large size. However, these devices are not suitable for removing weld bulges from wires of relatively small diameter, for example, 26-gauge wire. In these situations, the usual practice has been to remove the weld bulge by moving or rubbing an emery cloth over the weldment bulge. Inasmuch as the wires are joined by a coldwelding operation, there is a cold working of the metal, such as to lead to an embrittlement of the weldment. When the emery cloth is rubbed over the bulge, there is not only a wearing away of the bulge, but also an abrading of the relatively soft wire material on both sides of the weldment. It has been found that during the subsequent processing of joined wire sections through insulation applying equipment or cabling apparatus, a significant number of breaks occur in the wires at the weaker sites on either side of the removed weldment bulge.

In the manufacture of one type of cable known as pulp cable, small diameter wires of copper or aluminum are passed through a latex applicator and then through wiping dies which are slightly larger than the diameter of the wires. Each die exerts forces on the wire at the sections before and after the weldment. The forces often cause a break in the wire necessitating a re-welding operation and a re-stringing of the wire to pass through the wiping die.

SUMMARY OF THE INVENTION

The invention contemplates, among other things, a weld flash removing apparatus that includes a shearing die which progressively shears a weldment bulge from a pair of coldwelded wires without leaving any flash or undercutting the wire on either side of the welded joint.

More particularly, a wire having a welded joint with a weldment bulge and flash is gripped at spaced distances from the welded joint, and then moved relative to a unique shearing die which acts to progressively shear half of the weldment from the joined wires and then the other half of the weldment bulge. The die is formed with a circular bore terminating in a cutting face. The cutting face comprises a first tapered surface which forms with the circular bore a first semi-elliptical cutting surface, and a second stepped back tapered cutting face which forms with the circular bore a second semi-elliptical cutting surface.

BRIEF DESCRIPTION OF THE DRAWINGS

A more comprehensive understanding of the invention may be had by a consideration of the following detailed description in conjunction with the accompanying drawings, wherein FIG. 1 shows the end sections of two wires about to be hot or cold welded;

FIG. 2 shows the wire joint after welding and the resultant weldment bulge and flash;

FIG. 3 is a side elevational view of an apparatus for removing the weldment bulge and flash which embodies the principles of the present invention;

FIG. 4 is a top view partially in section taken along line 4—4 of FIG. 3 showing the arrangement of wire holders and a shearing die for progressively shaving the weldment bulge from the joined wires;

FIG. 5 is an enlarged view taken along line 5—5 of FIG. 4 showing the front of the shearing die and a clamping device for holding the die;

FIG. 6 is an enlarged view showing the approach of the weldment bulge to the shearing die;

FIG. 7 is a front view looking along line 7—7 of FIG. 3 illustrating the details of the wire gripping facilities;

FIG. 8 is an enlarged view of one of the wire gripping facilities that is utilized in the initial loading of the wire into the weldment removal apparatus;

FIG. 9 is an enlarged perspective view of the wire weldment shearing die particularly illustrating the stepped tapered structure that provides two semi-elliptical cutting surfaces for progressively shearing the weldment bulge from the wire; and FIG. 10 is an enlarged view of one of a pair of aligning members for accurately positioning the wire in the weldment shearing die.

DETAILED DESCRIPTION

Referring to FIG. 1, there are shown two wire sections 10 and 11 that are to be joined together by a coldwelding operation. Coldwelding is a process wherein the ends of the wires to be joined are forcibly abutted to cause a fusion of the metal at the ends of the respective wires. During coldwelding, the butted end faces of the wires bulge outwardly as indicated in FIG. 2 to form a bulge 12 and a circular ring of flash 13. In some welding operations heat is applied, but still, there results a weldment bulge. This bulge should be removed prior to subsequent processing of the wire. If the wire is subsequently insulated, the bulge may prevent passage through the insulation applying equipment, such as an extruder. Further, if the bulge receives a coating of insulation, it is of reduced thickness and may lead to short circuit conditions when the wire is associated with other wires in a cabling operation.

Referring to FIGS. 3 and 4, there is shown a weld removing apparatus which may be mounted on, or closely associated with, the coldwelding equipment for joining wire sections 10 and 11. A frame 16 is provided to support a housing 17 in which is mounted a pair of cylindrical bearings 18 and 19 through which extend a pair of slide rods 21 and 22. A pair of support or slide blocks 23 and 24 are mounted on and secured to the respective end sections of the slide rods 21 and 22.

A pair of L-shaped brackets 26 and 27 are bolted to the slide blocks 23 and 24, and as shown in FIG. 8 each bracket is provided with a V-shaped cutout 28 terminating in a slot 29. A pair of square sheets 31 and 32 made of a urethane elastomer are adhesively secured to the inner faces of the L-shaped brackets 26 and 27. As shown in FIG. 8, the elastomer square sheets are formed with a V-shaped slot 33 terminating in a slit 34 aligned with the slot 29. The slit sheets 31 and 32 act to temporarily hold the joined wire 10-11 during the initial stage of loading the wire into the shearing apparatus.

A pair of clamping devices 35 and 36 are provided to firmly hold the joined wire during a weldment shearing operation. The clamps include a pair of pedestals 37 and 38 secured to the blocks 23 and 24. A pair of standard-like clamp frames 39 and 41 are also attached to the blocks 23 and 24. There are mounted in top plates of the frames a pair of plain cylindrical bearings 42 and 43 for receiving rods 44 and 46. The actuating mechanism for each of the clamps is of commercial manufacture, and as shown in FIG. 7 includes an L-shaped arm 47 having a pair of crank arms 48 pivotally secured by a pin 49 to the upper end of the rod 44. The elbow of the L-shaped arm is pinned to a pair of links 51 having their other ends pinned to an abutment 52 projecting from the top plate of the frame 41.

The L-shaped arm includes a handle section 53 which is manipulated in a counterclockwise direction as shown in FIG. 7 to move the crank arm 48 about the pivot pin 49 to thrust the rod 46 in a downward direction through the bearing 43. Secured to the lower ends of the rods 44 and 46 are discs 56 and 57 having urethane elastomer pads 58 and 59 adhesively attached thereto. When the handles 53 are manipulated, the rods 44 and 46 are moved downwardly to move the pads 59 and 58 to clamp the wire 10-11 against the pedestals 37 and 38.

Considering now the weldment shearing device, attention is first directed to FIGS. 3, 4 and 5 wherein there is shown a first die holder block 61 secured to the housing 17 provided with a groove 62 to receive a first half 63 of a shearing die generally designated by the reference numeral 64. Die half 63 is secured in a groove by a set screw 66. Block 61 is formed with a pair of projecting ears 68 that are bored to receive a pintle 71 that extends through an ear projecting outwardly from the underside of a second block 73. This block 73 is provided with a groove 74 to receive a second half 76 of the cutter die 64. The die half 76 is secured in the groove by a set screw 77.

A latch arm 78 is pivoted on shaft 79 and is formed with a projecting tongue 81 which overlies the block 73 to hold the die halves 63 and 76 in abutting relation. A bowed leaf spring 82 secured to the housing 17 presses against the clamp arm 78 to hold it in position. The latch arm 78 includes a laterally projecting stud pin 83 which may be grasped to withdraw the latch arm 78 against the action of leaf spring 82. With the latch 78 released, the block 73 may be pivoted about the pintle 71 by lifting a stud pin 86 which laterally extends from the block 73.

Attention is directed to FIGS. 6 and 9 for a more detailed consideration of the weldment bulge shearing die 64. The die 64 is formed by drilling a cylindrical bore 91 through the die block to accommodate the particular wire size. A first beveled surface 92 is formed at one end of the die block to taper away from the cylindrical bore 91. As a result, the beveled surface 92 intersects the bore 91 to form a first semi-elliptical cutting surface 93. The end of the die block is further machined to form a step or set back 94, and then a second beveled surface 96 is formed to taper away from the cylindrical bore to provide a second semi-elliptical cutting surface 97. The die block is finally slit along a parting line 98 to form the respective die halves 63 and 76.

In addition to the slit sheets 31 and 32 for initially holding the welded wire, there are provided two aligning members comprising plates 101 and 102 having V-shaped slots 103 and 104 terminating in narrow guide grooves, such as groove 106 shown in FIG. 10, in which the wire is bottomed and positioned to rest in a position aligned with the die bore 91.

In use of the apparatus, the handle arm 83 is grasped to relieve the spring 82 thus permitting the latch arm 78 to fall away from the block 73. The block 73 is moved to the open position by manipulation of the stud pin handle 86. The clamping devices 35 and 36 are opened. The wire 10-11 is stretched and, laid and held in the slits 34 formed in the elastomer sheets 31 and 32 and in the guide slits 106 formed in the plates 101 and 102. The wire section 11 is accurately guided by the slits 106 to fit and seat within the half of the bore 91 formed in the lower die half 63. The wire is pulled taut and retained within the slits 34 and 106, and the handles 53 for the clamps 35 and 36 are moved to advance the resilient elastomer pads 89 and 59 downwardly to firmly grip the wire 10-11 against the pedestals 37 and 38.

The die holder block 73 is moved from the open position to move the die half 76 against the die half 63. The spring 82 is released to bear against the latch 78 which firmly holds the block 73 and, hence, the die half 76 in firm engagement with the die half 63.

A handle 110 (see FIG. 3) attached to block 24 is moved to the right. The block 24, the slide rods 21 and the block 23 are thus moved as a unit toward the right to advance the weldment 12 into the cutting die 64. The semi-elliptical cutting surface 93 will initially sever half of the weldment 12 from the wire 10-11. Further advance of the wire causes the second semi-elliptical cutting surface 97 to shear the other half of the weldment. Inasmuch as the cutting surfaces are semi-elliptical in shape, there is a progressive cutting of the weldment with a minimum amount of force imparted to the weld joint so as to preclude breaking of the wire. Referring to FIG. 6, it will be noted that the step back 94 provides a pair of very sharp edges 107 and 108 for initially engaging and cutting into the weldment.

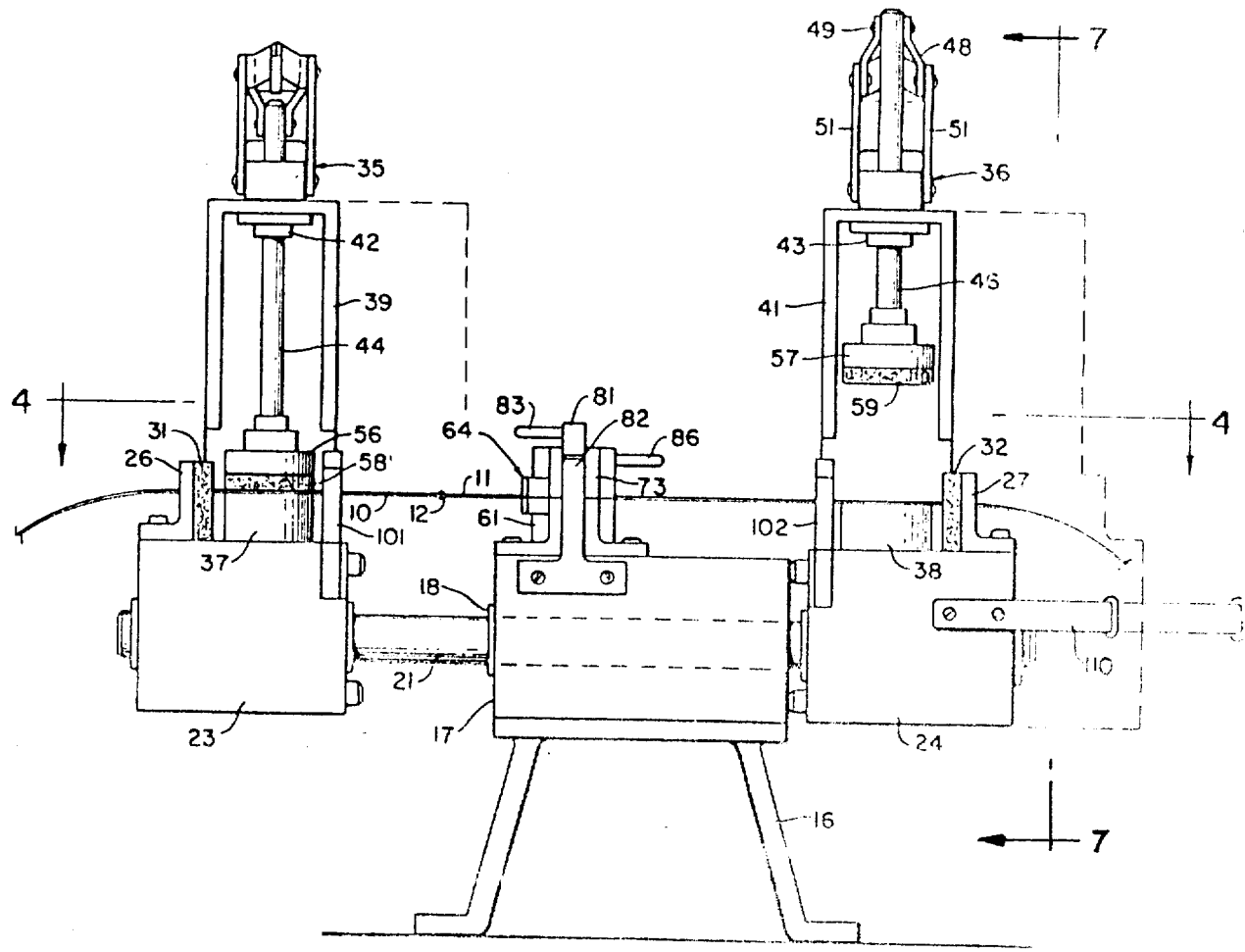

What is claimed is:

1. An apparatus for removing a bulbous portion formed on a strand member, which comprises:
   a stationary frame;
   a pair of shafts slidably mounted in and extending horizontally in parallel relation through said frame;
   a first slide mounted on said shafts and positioned on a first side of said frame, and a second slide mounted on said shafts and positioned on the other side of said frame;
   a pair of clamping devices mounted individually on the respective slides for gripping spaced sections of the strand with the bulbous portion interposed between the clamps;
   a cutting die having a longitudinal bore extending therethrough, said die having a pair of end surfaces axially displaced from each other and tapered toward and intersecting said bore to form a pair of axially spaced cutting edges; and
   means for securing said cutting die to said stationary frame to shear successively a first section and then a second section of said bulbous portion upon movement of the clamps and slides to advance the bulbous portion into said die.

2. An apparatus for shearing a protuberance from a wire, which comprises:
   a housing;
   a pair of spaced parallel cylindrical bearings mounted in and extending through said housing in a horizontal plane;
   a pair of rods slidably mounted in and extending from said bearings;
   a pair of blocks individually mounted on opposite end sections of said rods;
   a pair of clamps individually mounted on said blocks for gripping spaced sections of a wire placed in the clamp;
   a first die block mounted on said housing;
   a second die block pivotally mounted on the first die block;
   a first cutter die mounted in said first die block;
   a second cutter die mounted in said second die block to mate with the first cutter die;
   said mated cutter dies having a central bore and a first cutter end surface formed to taper downwardly away from the central bore to form a first semi-elliptical cutting surface, and a second cutter end surface formed to taper upwardly away from the central bore to form a second semi-elliptical cutting surface, said second tapered surface being set back from the first tapered surface to form a pair of axially spaced, sharp shear edges extending from said central bore; and
   means for moving the blocks and rods to advance a wire gripped by said clamps through said dies.

3. An apparatus as defined in claim 2, which includes:
   a pair of wire holding means, each of which is mounted on a separate one of said blocks in position to hold a wire in said pair of clamps and in said first cutter die, each holding means comprising a sheet of elastomer material with a V-shaped slot terminating into a slit for receiving and positioning a wire to extend through said pair of clamping means and said bore formed in said first cutter die.

* * * * *

UNITED STATES PATENT AND TRADEMARK OFFICE
CERTIFICATE OF CORRECTION

PATENT NO. : 4,324,515

DATED : April 13, 1982

INVENTOR(S) : John W. Ehling

It is certified that error appears in the above—identified patent and that said Letters Patent is hereby corrected as shown below:

The title page should appear as shown on the attached sheet.

Signed and Sealed this

Seventeenth Day of August 1982

[SEAL]

Attest:

GERALD J. MOSSINGHOFF

Attesting Officer

Commissioner of Patents and Trademarks

United States Patent [19]

Ehling

[11] 4,324,515
[45] Apr. 13, 1982

[54] DIE SHEAR APPARATUS FOR TRIMMING WIRE WELD BULGES

[75] Inventor: John W. Ehling, LaGrange Park, Ill.

[73] Assignee: Western Electric Company, Inc., New York, N.Y.

[21] Appl. No.: 135,731

[22] Filed: Mar. 31, 1980

[51] Int. Cl.³ .............................................. B23D 1/02
[52] U.S. Cl. ................................... 409/300; 83/914;
219/97; 228/13; 279/1 SJ; 407/64; 407/115;
409/140
[58] Field of Search ................... 409/300, 298, 140;
407/64, 115, 116; 83/914; 140/112; 228/13,
125; 219/97, 103; 279/1 SJ

[56] References Cited

U.S. PATENT DOCUMENTS

| | | | |
|---|---|---|---|
| 423,979 | 3/1890 | Anderson et al. | 409/300 |
| 1,817,695 | 8/1931 | Lauenstein | 279/1 SJ X |
| 2,233,928 | 3/1941 | Weaver | 407/115 X |
| 2,920,514 | 1/1960 | Johnson | |
| 2,945,117 | 7/1960 | Harris et al. | 219/97 |
| 3,015,995 | 1/1962 | Fahy | 409/300 |
| 3,227,851 | 1/1966 | Greenberger | 219/97 |
| 3,790,058 | 2/1974 | Filkorn | 228/2 |

Primary Examiner—Z. R. Bilinsky
Attorney, Agent, or Firm—R. P. Miller

[57] ABSTRACT

A bulge (12) formed by coldwelding two wire sections (10-11) is removed by advancing the wire through a bore (91) formed in a split cutting tool (64) having a pair of stepped-back tapered surfaces (92,96) at one end. The tapered surfaces terminate along a diameter of the bore to form a pair of spaced semi-elliptical cutting surfaces (93,97) which are successively rendered effective to remove semi-circular sections of the bulge. The apparatus includes facilities (31,32) for temporarily holding the wire in place within the cutting tool (64) and a clamping arrangement (35,36) for securely holding the wire during the weld bulge removal operation.

3 Claims, 10 Drawing Figures